US012650151B2

(12) United States Patent
Lorenz

(10) Patent No.: US 12,650,151 B2
(45) Date of Patent: Jun. 9, 2026

(54) CLUTCH UNIT FOR REVERSIBLY COUPLING A DRIVE SIDE TO AN OUTPUT SIDE OF A DRIVE TRAIN, AND ACTUATOR FOR A CLUTCH UNIT OF THIS TYPE

(71) Applicant: Schaeffler Technologies AG & Co. KG, Herzogenaurach (DE)

(72) Inventor: Elmar Lorenz, Rheinmünster Söllingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/871,163

(22) PCT Filed: May 15, 2023

(86) PCT No.: PCT/DE2023/100354

§ 371 (c)(1),
(2) Date: Dec. 3, 2024

(87) PCT Pub. No.: WO2023/241752

PCT Pub. Date: Dec. 21, 2023

(65) Prior Publication Data

US 2025/0327494 A1 Oct. 23, 2025

(30) Foreign Application Priority Data

Jun. 13, 2022 (DE) .................... 10 2022 114 775.4

(51) Int. Cl.
*F16D 25/08* (2006.01)
*F16D 48/02* (2006.01)

(52) U.S. Cl.
CPC ........... *F16D 25/083* (2013.01); *F16D 48/02* (2013.01); *F16D 2048/0212* (2013.01)

(58) Field of Classification Search
CPC .................. F16D 25/083; F16D 48/02; F16D 2048/0212; F16D 2023/141
See application file for complete search history.

(56) References Cited

U.S. PATENT DOCUMENTS 4,341,281 A * 7/1982 Nagy ..................... B60K 17/35
475/221
5,020,419 A * 6/1991 Amedei ................. F16H 61/30
92/52

(Continued)

FOREIGN PATENT DOCUMENTS

DE 102016212807 A1 1/2018
EP 0344714 A1 12/1989

(Continued)

*Primary Examiner* — Farhana Pervin

(57) ABSTRACT

A clutch unit includes a drive element with a drive element outer toothing, an output element with an output element outer toothing, a linearly movable shift collar with an inner toothing engaged with the drive element outer toothing, and an actuator arranged to shift the shift collar from a decoupled position in which the inner toothing is disengaged from the outer element outer toothing to a coupled position in which the inner toothing is engaged with the outer element outer toothing. The actuator includes a pot-shaped cylinder component formed from a metal sheet and includes an opening. The actuator also includes a cover arranged on the cylinder component, opposite the opening, with a cover opening, a piston guided in the cylinder component, and a shift rod. The shift rod is coupled to the piston and to the shift collar, and passes through the opening and the cover opening.

14 Claims, 2 Drawing Sheets

(56) References Cited

U.S. PATENT DOCUMENTS

| | | | | |
|---|---|---|---|---|
| 5,335,764 A * | 8/1994 | Leitner | .............. | B60K 17/3505 |
| | | | | 192/85.02 |
| 5,641,049 A * | 6/1997 | Kajitani | ................ | F16D 25/087 |
| | | | | 192/85.53 |
| 2014/0011633 A1 * | 1/2014 | Suzuki | ............... | F16H 61/2807 |
| | | | | 477/70 |
| 2015/0252858 A1 * | 9/2015 | Nobuyasu | ........... | F16D 25/0635 |
| | | | | 192/85.01 |
| 2016/0265601 A1 * | 9/2016 | Mastie | .................. | F16D 27/118 |
| 2019/0195290 A1 * | 6/2019 | Suzuki | ............... | F16H 37/0846 |

FOREIGN PATENT DOCUMENTS

| | | | |
|---|---|---|---|
| EP | 0510457 A1 | 10/1992 |
| EP | 3270011 A1 | 1/2018 |

* cited by examiner

CLUTCH UNIT FOR REVERSIBLY COUPLING A DRIVE SIDE TO AN OUTPUT SIDE OF A DRIVE TRAIN, AND ACTUATOR FOR A CLUTCH UNIT OF THIS TYPE

CROSS-REFERENCE TO RELATED APPLICATIONS

This application is the United States National Phase of PCT Appln. No. PCT/DE2023/100354 filed May 15, 2023, which claims priority to German Application No. DE102022114775.4 filed Jun. 13, 2022, the entire disclosures of which are incorporated by reference herein.

TECHNICAL FIELD

The present disclosure relates to a clutch unit for reversibly coupling a drive side to an output side of a drive train.

BACKGROUND

Such a clutch unit, often also called a "disconnect unit," is used, for example, in the drive units of a motor vehicle, such as a drive axle, which can also be an electric axle, often called an e-axle. The clutch unit serves to reversibly couple a drive side, to which a torque is applied, with an output side, to which the torque is to be transmitted and where it is forwarded. For example, it can be arranged between a drive unit and an intermediate shaft in order to couple an outlet of the drive unit, i.e., the drive side, with the inlet of the intermediate shaft, i.e., the output side. An arrangement between such an intermediate shaft and a differential is also conceivable, whereby the intermediate shaft, to which the torque coming from the drive is applied, represents the drive side, while the differential, to which the torque is transmitted, represents the output side. The clutch unit can therefore be integrated into such a drive train at different positions. The clutch unit can be switched in order to achieve or cancel a torque-resistant coupling of the drive side and output side via a controllable switching device, i.e., an actuator.

Such a clutch unit connects two toothed elements on the drive side and the output side, i.e., an externally toothed drive element, for example a first gear, is arranged on the drive side, while an externally toothed output element, for example a second gear, is provided on the output side, which elements are reversibly connected via a coupling element. Such a coupling element is regularly provided in the form of a linearly moveable shift collar, which sits on the drive element, i.e., is provided on the drive side, and engages into the outer toothing of the drive element with the inner toothing. By means of an actuator, the shift collar for coupling the drive side with the output side can be moved along the outer toothing of the drive element and pushed over the output element, so that the inner toothing of the shift collar also engages with the outer toothing of the output element. The drive element and the output element are then coupled together in a rotationally fixed manner via the shift collar that surrounds them both and connects them via the toothed engagement, so that the torque present on the drive side can be transmitted to the output side.

The integration of the actuator requires a corresponding installation space, which is often not sufficiently available at a preferred mounting position in a transmission.

SUMMARY

The present disclosure provides an improved clutch unit.

A clutch unit for reversibly coupling a drive side to an output side of a drive train includes a linearly moveable shift collar which is sitting on a drive element of the drive side and engages into an outer toothing of the drive element with an inner toothing, and which can be shifted into a coupling position from a decoupling position, along the outer toothing, via an output element of the output side, by engaging the inner toothing also into an outer toothing of the output element. An actuator is provided for shifting the shift collar, which has a linearly moveable piston and a shift rod coupled to the piston and connected to the shift collar, and the piston is guided in a pot-shaped cylinder component formed from a metal sheet. The cylinder component has an opening on one side through which the shift rod passes, and which is closed by a cover on the other side, said cover having an opening through which the shift rod passes, and, in the assembled state, the cylinder component is inserted into a recess with a compatible shape in a wall of a transmission.

The disclosure provides for the arrangement or integration of the actuator directly in a corresponding recess, which is installed in a wall of a transmission in which such an actuator or the clutch unit is installed. This transmission is, for example, part of an e-axle or another drive unit. The wall can be a wall of the transmission housing or a partition wall that divides the transmission. The design of this wall with a corresponding recess with a compatible shape therefore makes it possible to position the actuator directly on the wall side and countersink it into the recess accordingly, so that no additional installation space is required for its installation.

The actuator, which may be a hydraulic actuator, has a piston which is guided linearly in a cylinder component or a cylinder section formed there. According to the disclosure, this cylinder component is made from a simple metal sheet that is thin, e.g., by means of deep drawing. This cylinder component is designed in a corresponding pot-shaped manner, i.e., it has a specific geometry and is provided with a corresponding opening or borehole on one side, which forms a guide section for the shift rod, which is coupled to the piston. On the other side, the cylinder component is closed by a removable cover with an opening through which the shift rod passes and which forms a guide section on this side.

On the one hand, the cover enables the integration of the shift rod and the piston into the cylinder component and, on the other hand, the cylinder can also be closed by fastening or arranging the cover, so that a sub-assembly is created consisting of cylinder component, shift rod, piston and cover as well as corresponding sealing elements which serve to form corresponding pressure chambers into which the hydraulic fluid or compressed air is pressed. This sub-assembly can now be constructed as part of a pre-assembly so that the actuator can be tested for its functionality. Installation is also easy, as this sub-assembly only needs to be inserted into the recess on the wall side and fixed in place during installation. The recess itself has a corresponding through hole through which the shift rod engages, on which, as described, for example, the shift fork is arranged, which is coupled to the shift collar.

To create the indentation with a compatible shape, the component forming the wall may already be profiled accordingly as far as the basic geometry is concerned. The wall component is, for example, a component made of aluminum or a cast metal component, on which the basic three-dimensional geometry, including the recess, can already be formed during component production. It would be conceivable to insert the piston directly into the cylindrical recess and to guide it via sealing elements directly on the cylinder wall of the recess. However, this requires that the inner cylinder wall is machined with appropriate effort in order to form a suitable sealing seat for the piston-side sealing element(s). However, such processing may result in the formation of cavities, burrs or similar. During the piston movement, these surface structures can have an abrasive effect on the sealing element, which can be destroyed. In order to counteract this, the disclosure provides a simple cylinder component made of thin metal sheet, which is inserted as a cylinder or guide inlay into the recess, which then only needs to be machined relatively roughly, and which itself has the corresponding sealing surfaces or sealing seats for the piston-side sealing element(s).

According to the disclosure, the sheet metal cylinder component serving as an inlay in the recess has a cylinder section guiding the piston, which is axially limited by an annular flange, to which a cylinder flange is connected, which forms the guide section. The pot shape is ultimately formed via the cylinder section and the annular flange.

The annular flange may be followed by an axially extending cylinder flange through which the shift rod engages and in which it is guided in the manner of a linear guide. In the assembled state, the cylinder flange engages in a corresponding through hole or borehole in the wall, which also makes it possible to center the cylinder component or the actuator.

Furthermore, it can be provided that the cylinder component has a terminal, radially extending flange, against which the cover rests, wherein the flange and the cover have multiple through holes aligned with one another, which, in the assembled state, are penetrated by fastening screws screwed into the housing wall. A contact plane is formed over the annular flange, against which the cover rests flat. The flange and the cover have aligned through holes. For installation, appropriate fastening screws are guided through the aligned through holes and screwed into corresponding internal threaded boreholes in the wall, through which the actuator is fixed to the wall. The cover and the fastening screws are used to fix and center the cylinder component so that the required concentricity is achieved. In addition, the cover screw connection can also be used to generate the preload with which the cylinder component presses against the corresponding sealing elements provided on the recess side.

As described, due to the shape compatibility, the recess is also pot-shaped so that the cylinder component can be completely inserted into the recess. The recess has a borehole as described, whereby the cylinder flange engages in the borehole in the assembled state. Furthermore, the flange of the cylinder component also rests against the end face of the wall, so that axial support is provided here, in conjunction with the axial support via the annular flange forming the bottom of the cylinder section.

As described, one or more sealing elements may be provided in the recess, which seal off the cylinder component, so that, if a corresponding volume is to be separated and sealed via the wall or intermediate wall, a corresponding impermeability is also provided at this opening or interface.

Corresponding sealing elements are also provided on the piston and the cover, via which the piston and the cover are sealed to the cylinder component and the shift rod. This creates the corresponding pressure chambers, one in front of and one behind the piston, so that the piston can be actively pushed in one direction or the other and specific positions of the shift collar, i.e., the decoupling position and the coupling position, can be approached.

In addition to the clutch unit itself, the disclosure relates to an actuator for such a clutch unit, with a pot-shaped cylinder component formed from a metal sheet, in which a piston is accommodated in a linearly moveable manner, as well as a shift rod coupled to the piston. The cylinder component is closed on one side by an opening penetrated by the shift rod and on the other side by a cover which has an opening penetrated by the shift rod.

The cylinder component can have a cylinder section guiding the piston, which is axially limited by an annular flange, to which a cylinder flange is connected, which forms the opening and thus the guide section there.

The cylinder component can also include a terminal, radially extending flange against which the cover rests, and the flange and the cover include multiple aligned through holes through which, in the assembled state, fastening screws screwed into the housing wall pass.

Sealing elements provided on the piston and the cover ensure that the piston and the cover are sealed to the cylinder component and to the shift rod.

BRIEF DESCRIPTION OF THE DRAWINGS

The present disclosure is explained below on the basis of exemplary embodiments with reference to the drawings. The drawings are schematic representations, in which.

DETAILED DESCRIPTION

Figure 1:
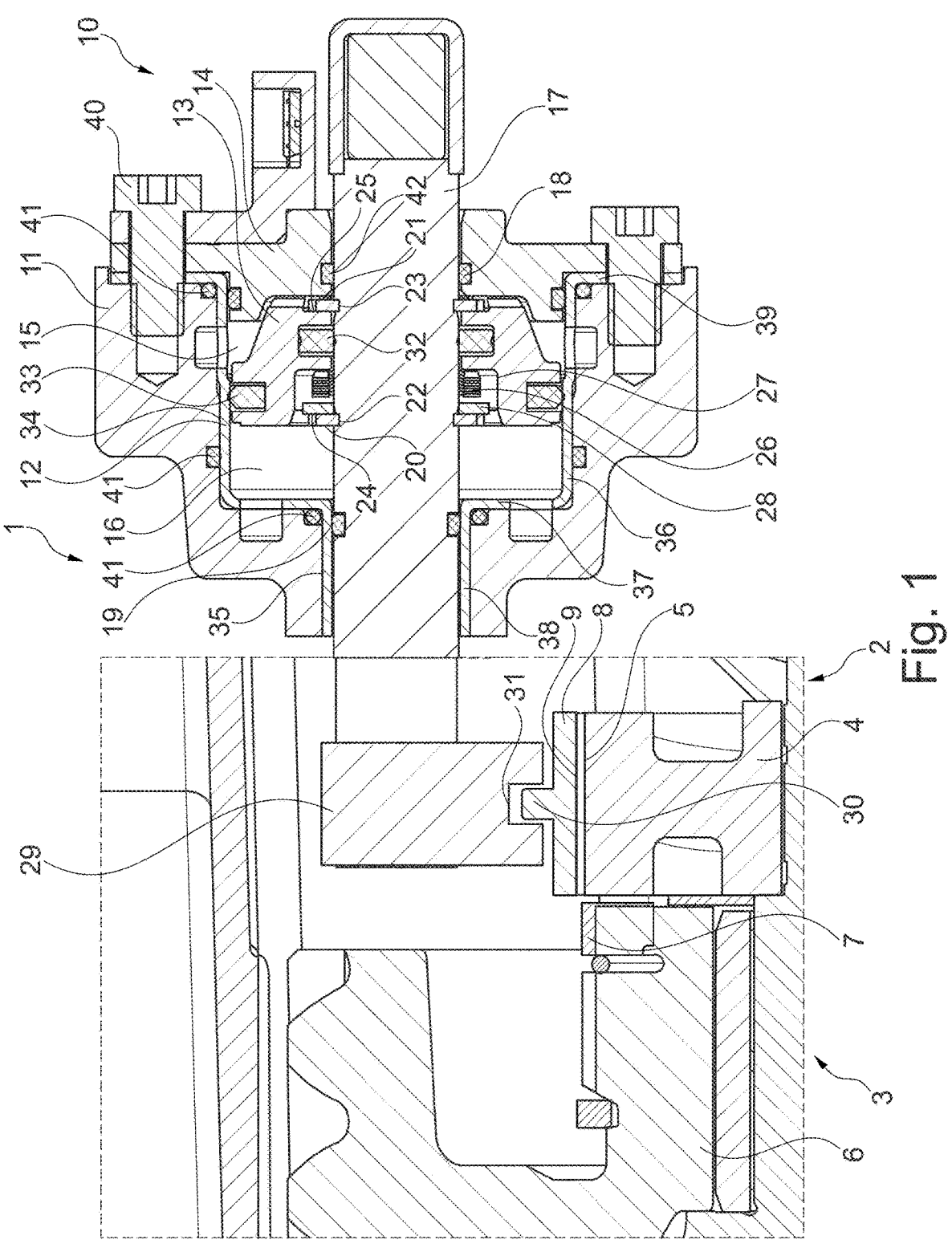
FIG. 1 shows a schematic diagram of a clutch unit according to the disclosure.

FIG. 1 shows a schematic diagram of a clutch unit 1 according to the disclosure, which can also be referred to as a coupling device, and which serves to couple a drive side 2, at which a torque is introduced or is present, with an output side 3, to which the torque is to be transmitted and where it is further branched. On the drive side 2, a drive element 4 is provided which has an outer toothing 5. The drive element 4 is, for example, a gear or externally toothed shaft.

On the output side 3, an output element 6 is provided which has an outer toothing 7, whereby this output element 6 can also be a gear or an externally toothed shaft or the like. The outer toothings 5, 7 are linear radial toothings that have the same pitch and are located on the same radius. In order to couple the drive element 4 with the output element 6 in a rotationally fixed manner, a shift collar 8 is provided which is axially displaceable. It has an inner toothing 9 with which it completely engages with the outer toothing 5 of the drive element 4 in the decoupling position shown in FIG. 1. This means that, in the decoupling position, the shift collar 8 is only coupled to the drive element 4. A torque transfer to the output element 6 is not possible in this position. However, if a torque transfer is to take place, it is necessary to move the shift collar 8 axially and to push it over the output element 6 or its outer toothing 7, so that the inner toothing 9 of the shift collar 8 is pushed into the outer toothing 7 and meshes therewith. At the same time, the engagement of the inner toothing 9 with the outer toothing 5 remains, so that the drive element 4 and the output element 6 are coupled in a rotationally fixed manner via the shift collar 8.

In order to realize this movement of the shift collar 8, an actuator 10 is provided, which is a hydraulic actuator. It is integrated into a wall 11 of a transmission, for which purpose the wall 11 has a pot-like recess 34 with a through hole 35. The actuator 10 has a pot-shaped cylinder component 12 formed from a sheet metal, which is form-fittingly inserted into the recess 34 with a compatible shape and is completely recessed therein. In the cylinder component 12, a cylinder section 36 is provided which forms a guide cylinder and in which a piston 13 is arranged. The cylinder component 12 is closed axially by a cover 14. Within the cylinder component 12, the piston 13 is axially displaceable via a hydraulic fluid, for which purpose a first pressure chamber 15 is provided which is realized between the piston 13 and the cover 14. On the opposite side, a second pressure chamber 16 is realized, which is realized between the piston 13 and the front wall of the insert 12. Depending on which pressure chamber 15, 16 the hydraulic fluid is pressed into, the piston is moved in one direction or the other.

Furthermore, a shift rod 17 is provided, which extends through the cylinder component 12 and the cover 14 and is sealed thereto via corresponding sealing elements 18, 19. The shift rod 17 is axially movable, for which purpose it is coupled to the piston 13. For this purpose, two axial stops 20, 21 are provided on the shift rod 17, which are realized via two retaining rings 24, 25 received in respective grooves 22, 23. Between these axial stops 20, 21, the piston 13 can be slightly axially displaced.

This axial displacement is possible against a spring element 26, which is designed as a wave spring or disc spring or as a corresponding spring package and is accommodated in an annular indentation 27 of the piston. On the one hand, the spring element 26 is supported on the piston 13 or the bottom of the indentation 27, and on the other hand on the axial stop 20 or a supporting disk 28 supported on the snap ring 24. If a fluid is pressed into the pressure chamber 15, the piston 13 is displaced to the left until the spring element 26 rests against the supporting disk 28, unless this is already the case. The shift rod 17 is further connected to a carrier 29, for example a shift fork, which in turn is connected to the shift collar 8 via a corresponding form-fitting engagement. For this purpose, the shift collar 8 rotating with the drive element 4 has, for example, a circumferential annular projection 30 which engages in a corresponding receiving groove 31 on the shift fork 29.

The cylinder component 12 also includes an annular flange 37 adjoining the cylinder section 36, to which a cylinder flange 38 is connected, which engages in the through hole 35. The cylinder flange 38 is penetrated by the shift rod 17; it serves as a guide section or as a linear guide for the shift rod 17 on this side. On the other side, the cylinder component 12 has a radially outwardly extending flange 39 which, in the assembled state, rests against the end face of the wall 11 and on which the cover 14 sits. The cover 14 is fastened to the wall 11 by means of multiple fastening screws 40 which pass through through holes provided on the cover 14 and the flange 39 and are screwed into internally threaded holes provided on the wall 11. The cylinder component 12 is sealed in the recess 34 via sealing elements 41, whereby the preload on the sealing elements is generated via the screw connection of the cover 14.

Two sealing elements 32, 33 are provided on the piston, via which a seal is provided on the one hand to the shift rod 17 and on the other hand to the cylinder component 12. Two sealing elements 43, 18 are also provided on the cover, via which a seal is provided to the cylinder component 12 and the shift rod 17. The shift rod 17 in turn is provided with a sealing element 19 which seals against the cylinder flange 38. The sealing elements 32, 33, 43, 18, 19 are accommodated in corresponding grooves.

Figure 2:
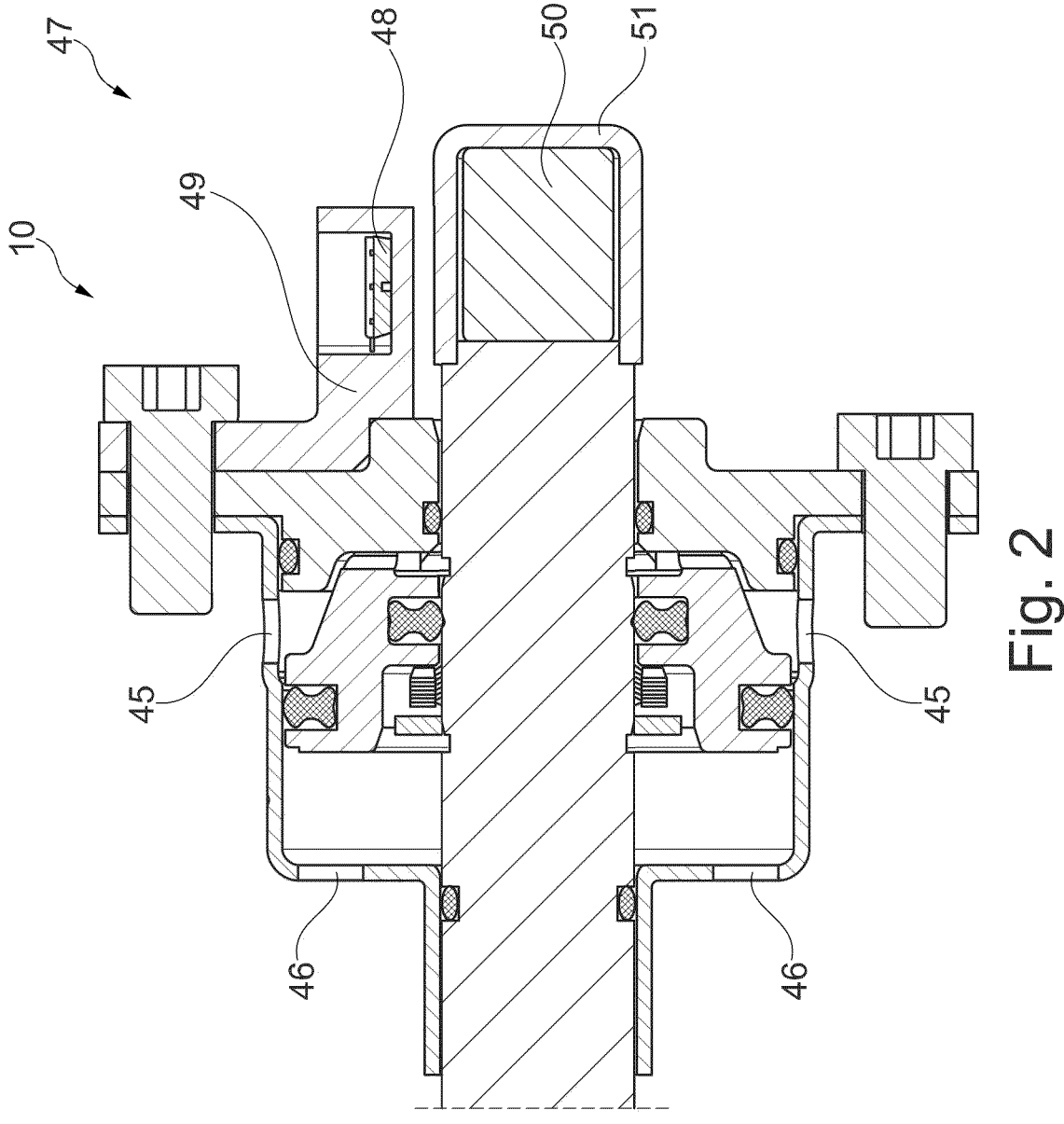
FIG. 2 shows an enlarged partial view of the actuator of the clutch unit as a sub-assembly.

FIG. 2 shows an enlarged view of the actuator 10 as a pure sub-assembly. This is clearly an independent, pre-assembled unit, which as such can be tested before installation. For this purpose, for example, hydraulic fluid is fed via feed holes 45, 46 provided on the cylinder component 12 either into the pressure chamber 15 or into the pressure chamber 16 in order to displace the piston 13. During assembly, this sub-assembly simply has to be inserted into the recess 34 by passing the shift rod 17 through the through hole 35 and fixed using the fastening screws 40.

Also shown is a displacement sensor 47 provided on the actuator, which serves to precisely detect the position of the shift rod 17 and thus of the shift collar 8. The displacement sensor 47 includes a sensor 48, e.g. a Hall sensor, which is accommodated in a sensor housing 49. The sensor housing 49 is L-shaped and is fixed by a fastening screw 40. It extends with one leg axially adjacent to the shift shaft 17, wherein the sensor 48 is arranged in this leg and thus adjacent to the shift rod 17. A magnetic element 50 is arranged axially on the shift rod 17, e.g. glued and covered with a protective cap 51. It interacts with the sensor 48, whose signals are evaluated by a control and processing device for the exact position detection of the magnetic element.

REFERENCE NUMERALS

1 Clutch unit
2 Drive side
3 Output side
4 Drive element
5 Outer toothing
6 Output element
7 Outer toothing
8 Shift collar
9 Inner toothing
10 Actuator
11 Wall
12 Cylinder component
13 Piston
14 Cover
15 Pressure chamber
16 Pressure chamber
17 Shift rod
18 Sealing element
19 Sealing element
20 Axial stop
21 Axial stop
22 Groove
23 Groove
24 Retaining ring
25 Retaining ring
26 Spring element
27 Indentation
28 Supporting disk
29 Carrier
30 Annular projection
31 Shift fork
32 Sealing element
33 Sealing element
34 Recess
35 Through hole
36 Cylinder section
37 Annular flange
38 Cylinder flange
39 Flange
40 Fastening screw
41 Sealing element
43 Sealing element
45 Feed hole 46 Feed hole
47 Displacement sensor
48 Sensor
49 Sensor housing
50 Magnetic element
51 Protective cap

The invention claimed is:

1. A clutch unit for reversibly coupling a drive side to an output side of a drive train, the clutch unit having a linearly moveable shift collar which is sitting on a drive element of the drive side and engages into an outer toothing of the drive element with an inner toothing, and which can be shifted into a coupling position from a decoupling position, along the outer toothing, via an output element of the output side, by engaging the inner toothing also into an outer toothing of the output element, wherein an actuator is provided for shifting the shift collar, which has a linearly moveable piston and a shift rod coupled to the piston and coupled to the shift collar, wherein the piston is guided in a pot-shaped cylinder component formed from a metal sheet, which has an opening on one side through which the shift rod passes, and which is closed by a cover on the other side, said cover having an opening through which the shift rod passes, wherein, in an assembled state, the cylinder component is inserted into a recess with a compatible shape in a wall of a transmission, wherein the cylinder component has a cylinder section guiding the piston, which is axially limited by an annular flange, to which a cylinder flange is connected, which forms the guide section.

2. The clutch unit according to claim 1, wherein the cylinder component has a terminal, radially extending flange, against which the cover rests, wherein the flange and the cover have multiple through holes aligned with one another, which, in the assembled state, are penetrated by fastening screws screwed into the wall.

3. The clutch unit according to claim 1, wherein the recess is pot-shaped and has a borehole, wherein, in the assembled state, the cylinder flange engages in the borehole or the flange rests against an end face of the wall.

4. The clutch unit according to claim 1, wherein one or multiple sealing elements are provided in the recess, which sealing elements seal towards the cylinder component.

5. The clutch unit according to claim 1, wherein the piston and the cover are each provided with sealing elements, via which the piston and the cover are sealed towards the cylinder component and towards the shift rod.

6. A clutch unit, comprising:
a drive element comprising a drive element outer toothing;
an output element comprising an output element outer toothing;
a linearly movable shift collar comprising an inner toothing engaged with the drive element outer toothing; and
an actuator arranged to shift the linearly movable shift collar from a decoupled position in which the inner toothing is disengaged from the outer element outer toothing to a coupled position in which the inner toothing is engaged with the outer element outer toothing, the actuator comprising:
a pot-shaped cylinder component formed from a metal sheet, the pot-shaped cylinder component arranged for assembly in a recess of a transmission wall and comprising:
an opening;
a cylinder section;
an annular flange axially limiting the cylinder section; and a cylinder flange extending from the annular flange and forming the opening;
a cover arranged on the pot-shaped cylinder component, opposite the opening, and comprising a cover opening;
a linearly movable piston guided in the cylinder section of the pot-shaped cylinder component; and
a shift rod:
coupled to the linearly movable piston and to the linearly movable shift collar; and
passing through the opening and through the cover opening.

7. The clutch unit of claim 6, wherein:
the pot-shaped cylinder component further comprises a radially extending flange;
the cover rests against the radially extending flange;
the radially extending flange and the cover comprise respective through holes aligned with one another; and
in an assembled state, fastening screws extend through the respective through holes and are screwed into the transmission wall.

8. The clutch unit of claim 7, wherein:
the recess is pot-shaped and comprises a borehole;
in the assembled state, the cylinder flange engages in the borehole; and
the radially extending flange rests against an end face of the transmission wall.

9. The clutch unit of claim 6, further comprising a sealing element arranged in the recess for sealing the pot-shaped cylinder component.

10. The clutch unit of claim 6, further comprising:
a first sealing element for sealing the linearly movable piston to the pot-shaped cylinder component;
a second sealing element for sealing the linearly movable piston to the shift rod;
a third sealing element for sealing the cover to the pot-shaped cylinder component; and
a fourth sealing element for sealing the cover to the shift rod.

11. A clutch unit for reversibly coupling a drive side to an output side of a drive train, the clutch unit having a linearly moveable shift collar which is sitting on a drive element of the drive side and engages into an outer toothing of the drive element with an inner toothing, and which can be shifted into a coupling position from a decoupling position, along the outer toothing, via an output element of the output side, by engaging the inner toothing also into an outer toothing of the output element, wherein an actuator is provided for shifting the shift collar, which has a linearly moveable piston and a shift rod coupled to the piston and coupled to the shift collar, wherein the piston is guided in a pot-shaped cylinder component formed from a metal sheet, which has an opening on one side through which the shift rod passes, and which is closed by a cover on the other side, said cover having an opening through which the shift rod passes, wherein, in an assembled state, the cylinder component is inserted into a recess with a compatible shape in a wall of a transmission, wherein the cylinder component has a terminal, radially extending flange, against which the cover rests, wherein the flange and the cover have multiple through holes aligned with one another, which, in the assembled state, are penetrated by fastening screws screwed into the wall.

12. The clutch unit according to claim 11, wherein the recess is pot-shaped and has a borehole, wherein, in the assembled state, the flange engages in the borehole or the flange rests against an end face of the wall.

13. The clutch unit according to claim 11, wherein one or multiple sealing elements are provided in the recess, which sealing elements seal towards the cylinder component.

14. The clutch unit according to claim 11, wherein the piston and the cover are each provided with sealing elements, via which the piston and the cover are sealed towards the cylinder component and towards the shift rod.

* * * * *